March 15, 1932. L. F. CURTISS 1,849,911
PROCESS AND APPARATUS FOR TESTING CATALYSTS
Filed April 2, 1929
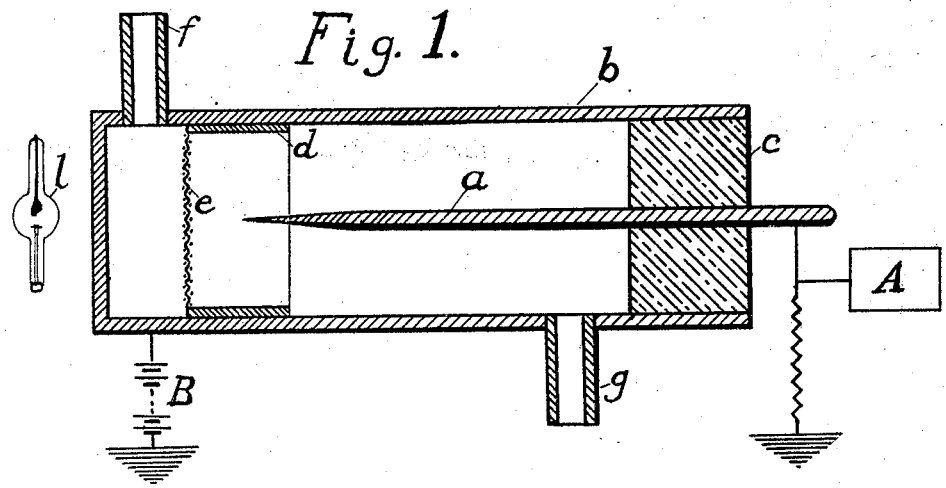
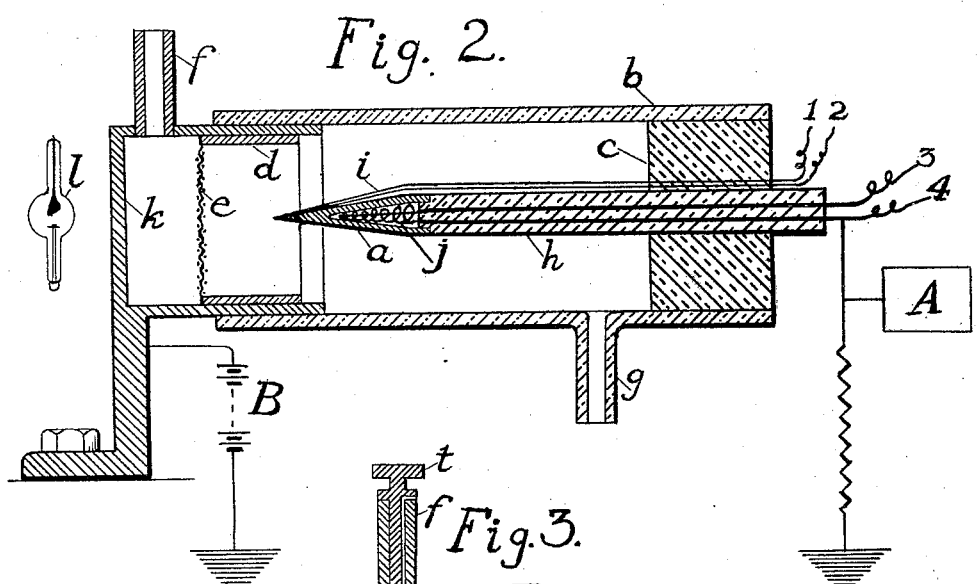
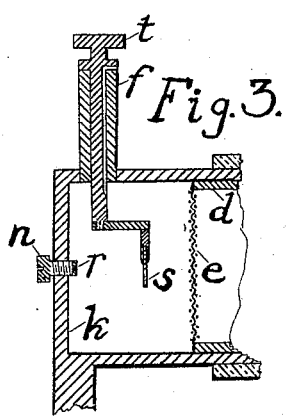
Witnesses
H. L. Martin
L. L. Stockmann
Inventor
Leon F. Curtiss
by Andrew T. Dupont
his Attorney.

Patented Mar. 15, 1932

1,849,911

UNITED STATES PATENT OFFICE

LEON F. CURTISS, OF GARRETT PARK, MARYLAND

PROCESS AND APPARATUS FOR TESTING CATALYSTS

Application filed April 2, 1929. Serial No. 351,925.

In the chemical industry substances known as catalysts are widely used to induce and accelerate chemical reactions. Many chemical processes are entirely dependent on proper catalysts. These catalysts must have a very delicate and exact preparation to be effective and in present practice the quality of catalysts can be determined only by somewhat laborious trials under the actual conditions and in the same way as they are intended to be used.

My invention relates to a method and an apparatus for determining the relative efficiency of various catalysts and also the relative efficiency of gases and vapors when used with a given catalyst under varying conditions of temperature and pressure.

The main feature of my invention consists in using the catalyst as an electrode in a vessel containing a gas which may be ionized by any suitable method for producing ions in a gas, the gas thus forming part of the electrical circuit. As will appear from the description to follow, it is then possible to determine the efficiency of the catalyst at once from the behavior of the current in the electrical circuit, thus eliminating the tedious methods now employed for this purpose.

The accompanying drawings show in Figures 1, 2 and 3 diagrams of some of the arrangements which I have found particularly effective for applying this process to the testing of catalysts. Fig. 1 represents a hollow cylinder, $b$, of suitable metal, such as brass, copper, iron, etc., closed at one end and fitted with a gas-tight insulating bushing, $c$, at the other end. The bushing, $c$, supports a sharpened rod, $a$, of the catalyst to be tested. A metal sleeve, $d$, supports a metal screen, $e$, in the cylinder, $b$, which is provided with side-tubes, $f$ and $g$. A source of electrical energy, such as a battery B, is connected with the cylinder, $b$, which is in turn in electrical connection with the metal screen, $e$, the opposite terminal of the battery being connected to ground. The rod, $a$, is connected to the ground through a resistance and also a current-detecting device, such as a vacuum tube amplifier, as shown at A.

Fig. 2 shows a slightly different apparatus for utilizing my process. A metal bushing, $k$, with a leg for supporting it fits into a porcelain tube, $b$, which is closed at the opposite end by a porcelain bushing, $c$. The bushing, $c$, supports a two-hole porcelain tube, $h$, which supports a hollow metal point, $a$, on its inner end. The metal point, $a$, contains an electrical heating element, $j$, connection with which is made by the wires 3 and 4, through the holes in the porcelain tube, $h$. A thermojunction, $i$, is attached to the outer surface of the point, $a$, as shown, and wires 1 and 2 lead from it to the outside of the apparatus. The bushing, $k$, contains a sleeve, $d$, and metal screen, $e$, with which it is in electrical contact. The bushing, $k$, also has a side tube, $f$, and the porcelain tube, $b$, has a similar tube, $g$. The battery B and the current detecting device A are connected as shown.

A further modification of Fig. 2 is shown in Fig. 3. The bushing, $k$, has a screw $n$, threaded through the front face. The screw, $n$, carries a metal button, $r$, inside the bushing, $k$. The side-tube, $f$, has a rod, $t$, which may be rotated from without, inserted through it. The rod, $t$, carries a shutter, $s$, at its lower extremity. The sleeve, $d$, and screen, $e$, are retained as shown. The rod, $t$, has a groove cut longitudinally along one side as indicated to permit the passage of gas. It is apparent that in the apparatuses above described, the elements, $a$, and $e$, will function as electrodes when the electrical potential of the element, $a$, is different from the electrical potential of element, $e$.

Having now described forms of apparatus suitable for applying my process to the testing of catalysts and gases used therewith, I now proceed to explain the action of the apparatus and the details of the process in a particular case.

Referring to Fig. 1 the operation of testing a catalyst is as follows: Having prepared a pointed rod, $a$, of the catalyst and mounted it as shown, a potential is applied to the metal cylinder, $b$, which is in electrical connection with the metal screen, $e$, by a battery or other suitable source of potential at B, the other terminal of the battery being connected to earth. Some form of current-detecting device, for example a vacuum tube amplifier, using 201—A, 240 type of tubes, screen grid tubes, and the like, or a sensitive galvanometer, electrometer, or the like, is connected to the rod, $a$, as shown at A, the rod, $a$, being connected to earth at the same time through a high resistance. Any gas to be used with the catalyst may be allowed to circulate in the apparatus through the side-tubes, $f$ and $g$, and the pressure controlled as desired. The screen, $e$, which serves as an adjustable electrode, is placed at a suitable distance from the point, this position depending on the voltage applied to the outer electrode and the sharpness of the point. The method of operation consists in adjusting the voltage applied by B while the gas in the cylinder, $b$, is exposed to an ionizing agency, such as X-radiation obtained from the X-ray bulb, $l$, as indicated in the figure. The efficiency of the catalyst is then made evident by the electrical surges occurring in the electrical circuit thus formed, which surges are observed by means of the current-detecting device, A. When proper adjustments have been made, only a few minutes are required to complete the test.

The method described above for utilizing my process can be carried on only at room temperature conveniently. Since it is often desirable to test catalysts at higher temperatures, I have devised the apparatus represented by Fig. 2. This form of the apparatus also makes the process available for catalysts that are not readily formed into rods, such as powders, etc. Referring to Fig. 2 the operation consists in coating the catalyst on the tip of the metal point, $a$, and maintaining the temperature at the required degree by the heating element, $j$, the temperature being measured by the thermo-junction, $i$. Otherwise the operation is as outlined for Fig. 1.

It is sometimes desirable to use the radiations from radioactive substances, such as polonium, as an ionizing agent in my process and the modification shown in Fig. 3 makes this convenient. The radioactive substance is coated on the metal button, $r$, where the radiations may ionize the gas contained in the apparatus. The radiations may be excluded from the main body of the gas by rotating the shutter, $s$, by means of the rod $t$.

As a specific example of the use of my invention, and not intending to have the scope of my invention limited thereto, I will now describe the use of the invention in determining the efficiency of a metallic copper catalyst in the presence of hydrogen gas. In this case the rod, $a$, (Fig. 1) is of copper and its point has been treated in a manner calculated to put it in the catalytic condition. The hydrogen gas is continuously circulated through the cylinder $b$, by means of the side-tubes, $f$ and $g$. The potential is applied to the cylinder, $b$, which is in electrical contact with the electrode, $e$, and increased gradually, the gas being kept constantly ionized by X-radiation from the X-ray bulb, $l$, as shown in Fig. 1. During this procedure the current-detecting device, A, is observed for surges or other electrical disturbances in the circuit. When the voltage applied by B has reached the proper value, say two thousand volts, a series of discrete and independent surges will be observed in A if the catalyst has been properly prepared. If the copper has not been properly treated so as to make it effective as a catalyst no independent surges will appear and nothing will happen in the electrical circuit until the potential applied by B has been raised to the arcing point, when a more or less steady current will be detected in the circuit by A, readily distinguishable from the independent surges referred to above. Furthermore the rapidity of these surges are, under properly controlled conditions, a measure of the degree of efficiency of the catalyst. A further use of the process may be illustrated by this same special case. If the copper is in the catalytic condition and the surges are regularly appearing and then a gaseous impurity be admitted into the cylinder, $b$, and if this impurity is such as will destroy or impair the catalytic effectiveness of the copper, then the surges cease immediately. Hence the arrangement is also at once a process for detecting impurities in gases and vapors which are being used with catalysts. The procedure described above is not limited to the testing of copper catalysts, as the process is available for testing any catalyst that can be formed into, or coated on an electrode. Also any desired gas can be tested and the voltages used may vary with the different gases and catalysts tested.

While I have described my invention with reference to the details of a particular embodiment, it is to be understood that I do not intend thereby to limit my invention to the precise construction shown and methods of operation described, but intend that all such modifications of the process, as will suggest themselves to one skilled in the art, be considered as coming within the spirit and scope of my invention.

I claim:

1. A process for testing catalysts consisting in placing the specimen to be tested in an atmosphere ionized by radiations from radioactive substances, in applying a potential to said specimen, and in recording the electrical surges therein.

2. A process for testing catalysts consisting in placing the specimen to be tested in an ionized atmosphere, applying a potential to said specimen, and recording electrical surges therein.

3. A process for determining the efficiency of catalysts consisting in coating an electrode with the catalyst, applying an electrical potential difference between this electrode and another adjacent electrode, maintaining a gas between said electrodes, ionizing said gas, and measuring the resulting electrical surges in the electrical circuit so formed.

4. A process for determining the efficiency of catalysts consisting in forming the catalyst into an electrode, applying an electrical potential difference between such an electrode and another adjacent electrode, maintaining a gas between such electrodes, ionizing said gas, and measuring the electrical surges in the electrical circuit so formed.

5. A process for testing the catalytic properties of gases, consisting in applying a potential to two electrodes, in surrounding said electrodes with an atmosphere of the gases ionized by X-radiation and in recording the electrical surges in said gases.

6. A process for testing the catalytic properties of gases, consisting in establishing a potential difference between two electrodes, surrounding said electrodes with an atmosphere of the ionized gases, and recording the electrical surges in one of said electrodes.

7. A process for simultaneously determining the efficiency of a catalyst and the purity of a gas enveloping the catalyst, consisting in forming an electrode of the catalyst and applying a potential difference between such an electrode and another adjacent electrode, maintaining the gas to be tested between said electrodes, ionizing the gas, and measuring the electrical surges in the electrical circuit so formed.

8. A process for testing the efficiency of a catalyst, comprising subjecting the catalyst, in the presence of an enveloping gas, to a difference of electrical potential, ionizing the gas and measuring the resulting electrical surges.

9. A process for simultaneously testing the efficiency of a catalyst and the purity of a gas enveloping the catalyst, comprising subjecting the catalyst to a difference in electrical potential, ionizing the gas, and measuring the resulting electrical surges.

10. A process for testing the efficiency of a catalyst, comprising subjecting the catalyst coated on an electrode in the presence of an enveloping gas to a difference of electrical potential, ionizing the gas, and measuring the resulting electrical surges.

11. In an apparatus for testing the efficiency of catalysts and gases, an electrode adapted to contain a body of gas, connection between said electrode and a source of electrical energy, a gas inlet and outlet for said electrode, a second electrode of the catalyst to be tested supported within said first electrode by an insulating bushing, said second electrode terminating in a point, a metal grid disposed within the first electrode and adjacent to the point of the second electrode, this second electrode being connected with a current-detecting device.

12. In an apparatus for testing the efficiency of catalysts and gases, an electrode consisting of a hollow metal point, containing a heating element, said point being coated on the outside with the catalyst to be tested.

13. In an apparatus for testing the efficiency of catalysts and gases, an electrode adapted to contain a body of gas, connection between such electrode and a source of electrical energy, a gas inlet and outlet for such electrode, a second hollow electrode supported within said first electrode by an insulating bushing, said second electrode terminating in a point on which the catalyst to be tested may be coated, a heating element located within said second electrode, a metal grid disposed within the first electrode and adjacent to the point of the second electrode, this second electrode being connected with a current-detecting device.

14. An apparatus for testing catalysts comprising a hollow member providing a chamber, a solid rod extending into said chamber, said rod and hollow member having good electrical conductivity, means for supporting said rod in said chamber and for insulating it from the hollow member, means for admitting and exhausting a gas to and from said chamber, and means providing an electrical circuit between said hollow member and said rod.

In testimony whereof I affix my signature.

LEON F. CURTISS.